(12) United States Patent
Doragh et al.

(10) Patent No.: US 7,558,227 B2
(45) Date of Patent: Jul. 7, 2009

(54) SYSTEM AND METHOD FOR MONITORING FOR WAKE EVENTS IN A WIRELESS LOCAL AREA NETWORK

(75) Inventors: Philip H. Doragh, Cypress, TX (US); Craig Walrath, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 833 days.

(21) Appl. No.: 10/811,404

(22) Filed: Mar. 26, 2004

(65) Prior Publication Data

US 2005/0213524 A1    Sep. 29, 2005

(51) Int. Cl.
*H04B 7/00*    (2006.01)
(52) U.S. Cl. .................. 370/311; 370/318; 370/328; 370/310
(58) Field of Classification Search ................ 370/310, 370/328, 338, 351, 389, 400, 401, 311; 455/403, 455/422.1, 426.1, 432.1, 432.2, 550.1, 575.1, 455/414.1; 340/825, 7.51
See application file for complete search history.

(56) References Cited

U.S. PATENT DOCUMENTS

| | | | |
|---|---|---|---|
| 5,907,542 A * | 5/1999 | Kuehnel et al. ............. 370/331 |
| 6,580,704 B1 | 6/2003 | Wellig et al. | |
| 6,691,071 B2 * | 2/2004 | Kerr et al. ................... 702/188 |
| 7,020,472 B2 * | 3/2006 | Schmidt ...................... 455/450 |
| 7,076,252 B1 * | 7/2006 | Hirvonen ..................... 455/446 |
| 2001/0031626 A1 * | 10/2001 | Lindskog et al. ........... 455/67.3 |
| 2002/0132603 A1 | 9/2002 | Lindskog et al. | |
| 2003/0096611 A1 * | 5/2003 | Cooper ....................... 455/434 |
| 2003/0118015 A1 * | 6/2003 | Gunnarsson et al. ......... 370/389 |
| 2003/0159074 A1 | 8/2003 | Oar et al. | |
| 2003/0179725 A1 | 9/2003 | Lo et al. | |
| 2003/0185172 A1 * | 10/2003 | Rue ............................. 370/331 |
| 2003/0220110 A1 * | 11/2003 | Kizu et al. ................... 455/445 |
| 2004/0264396 A1 * | 12/2004 | Ginzburg et al. ............ 370/311 |
| 2005/0034001 A1 * | 2/2005 | Pontarelli ..................... 713/320 |
| 2005/0190738 A1 * | 9/2005 | Smavatkul et al. ........... 370/346 |
| 2006/0193272 A1 * | 8/2006 | Chou et al. .................. 370/310 |

FOREIGN PATENT DOCUMENTS

EP    1 311 086    5/2003

OTHER PUBLICATIONS

Foreign Communication including Search Report dated Aug. 1, 2005.

* cited by examiner

*Primary Examiner*—Jean A Gelin

(57) ABSTRACT

In accordance with an embodiment of the present invention, a method comprises transmitting, from a wireless local area network (LAN) device of a host device to an access point of a wireless network, a request to disassociate from the access point, the request to disassociate further comprising a request to monitor for wake events for the host device and switching off a transceiver of the wireless LAN device after transmission of the disassociate request.

33 Claims, 2 Drawing Sheets

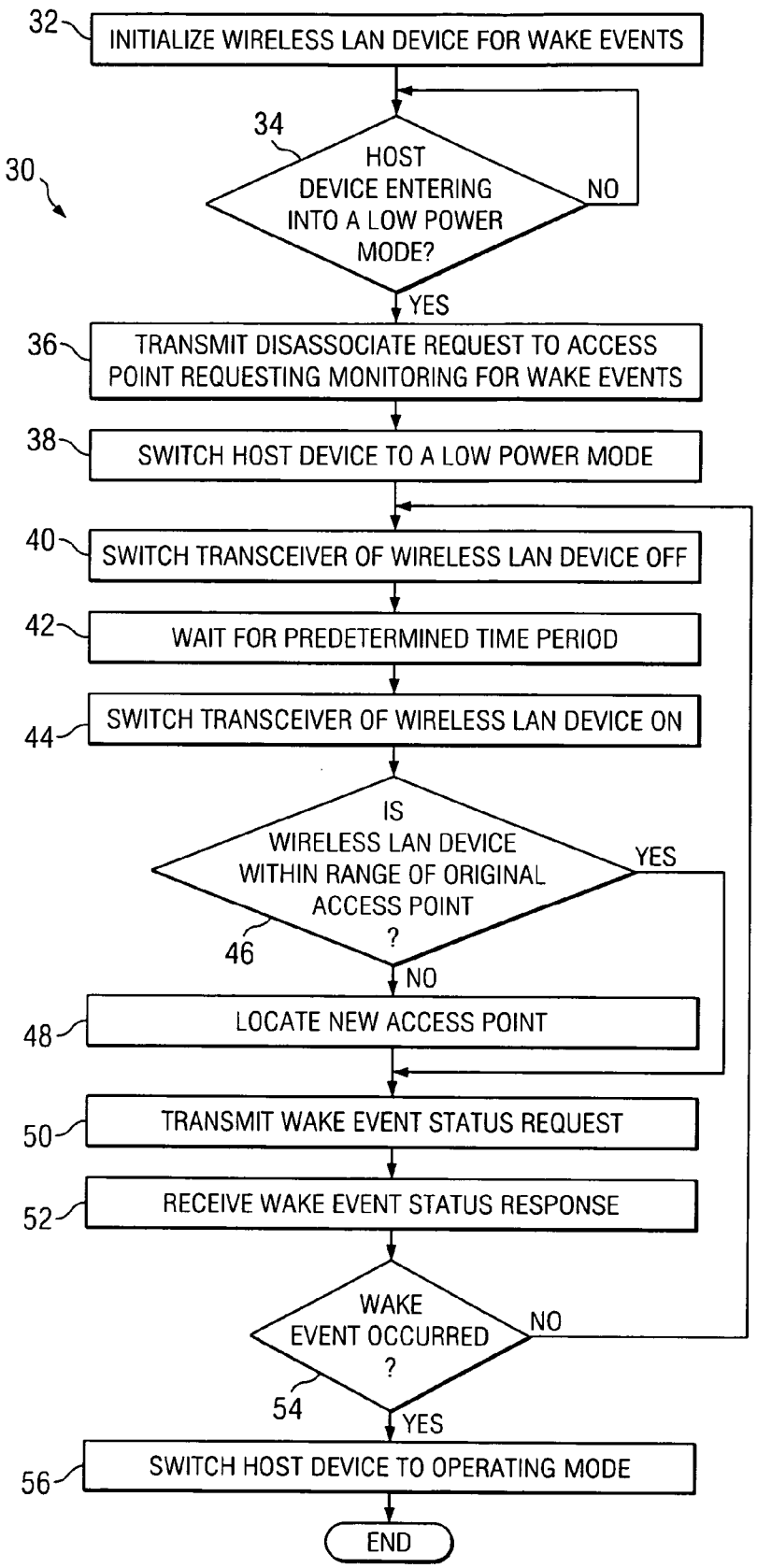

SYSTEM AND METHOD FOR MONITORING FOR WAKE EVENTS IN A WIRELESS LOCAL AREA NETWORK

TECHNICAL FIELD

The present invention relates generally to the field of communications, and more particularly to a system and method for monitoring for wake events in a wireless local area network.

BACKGROUND

Wireless local area networks (LANs) have been developed to work in conjunction with or in place of wired local area networks. In a wireless LAN, one or more host devices comprising wireless LAN devices communicate with one or more base stations or access points. The access points bridge the wireless LAN and a wired communication network and act as controllers for the wireless LAN.

The consumption of power by a host device is a grave concern, especially if the host device is battery-operated. As long as the host device is powered on, the wireless LAN device of the host device is on. While the wireless LAN device is on, it transmits and receives signals to and from the access points. This continuous transmission and receipt of signals by the wireless LAN device accounts for a large percentage of the power consumption of the wireless LAN device and causes a sizeable unnecessary drain on the battery power of the host device.

SUMMARY

In accordance with an embodiment of the present invention, a method comprises transmitting, from a wireless local area network (LAN) device of a host device to an access point of a wireless network, a request to disassociate from the access point, the request to disassociate further comprising a request to monitor for wake events for the host device and switching off a transceiver of the wireless LAN device after transmission of the disassociate request.

In accordance with another embodiment of the present invention, a method comprises receiving, from a wireless local area network (LAN) device of a host device, a request to disassociate from an access point, the request to disassociate further comprising a request to monitor for at least one wake event for the host device and transmitting, in response to receiving a request for a wake event status, a wake event status indicating whether at least one wake event for the host device occurred.

In accordance with another embodiment of the present invention, a system, comprises application logic operable to transmit, from a wireless local area network (LAN) device of a host device to an access point of a wireless network, a request to disassociate from the access point, the request to disassociate further comprising a request to monitor for wake events for the host device and switch off a transceiver of the wireless LAN device after transmission of the disassociate request.

BRIEF DESCRIPTION OF THE DRAWINGS

For a more complete understanding of the present invention, the objects and advantages thereof, reference is now made to the following descriptions taken in connection with the accompanying drawings in which:

FIG. 2 is a flowchart of an embodiment of a method for operating a wireless local area network device according to the invention;

DETAILED DESCRIPTION OF THE DRAWINGS

The preferred embodiments and advantages of the present invention are best understood by referring to FIGS. 1 through 4 of the drawings.

Figure 1:
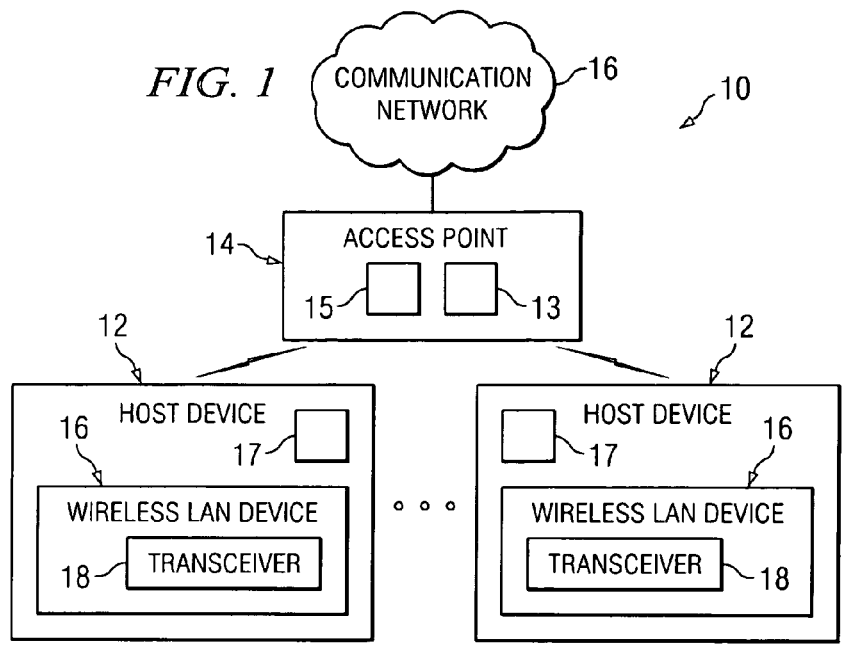
FIG. 1 is a schematic diagram of an exemplary wireless network according to an embodiment of the invention.

FIG. 1 is a schematic diagram of an exemplary wireless network according to an embodiment of the invention. In an exemplary embodiment, the wireless network is a wireless local area network (WLAN) 10. If desired, the wireless network may be a wide area network (WAN), a Global Positioning System (GPS) network, a metropolitan area network (MAN), and/or the like. WLAN 10 comprises a plurality of host devices 12, for example a portable computer, a desktop computer, a cellular phone, a personal digital assistant (PDA), a camera, a printer, and/or the like and at least one central controller or access point (AP) 14.

AP 14 is communicatively coupled with a communication network 16, such as the Internet, an Intranet, an extranet, and/or the like. AP 14 may be coupled with communication network 16 either wirelessly or with the aid of wires. AP 14 comprises application logic 13. Method 60 of FIG. 3 and method 80 of FIG. 4 are examples of application logic 13. In an exemplary embodiment, AP 14 comprises an association table 15.

Host device 12 comprises a wireless device, such as a wireless LAN device 16, for example a PCI (Peripheral Component Interconnect) card, USB (Universal Serial Bus), PCMCIA (Personal Computer Memory Card International Association) card, SDIO (Secure Digital Input-Output) card, NewCard, Cardbus, and/or the like. Association table 15 comprises information on the wireless LAN devices associated with the access point. Wireless LAN device 16 comprises at least one transceiver 18 which is operable to transmit and receive signals to and from access point 14. Transceiver 18 comprises any transceiver now known or later developed, for example, a radio transceiver, an infrared (IR) port, an optical port, and/or the like. In an alternative embodiment, the wireless LAN device comprises separate transmitters and receivers. If desired, the wireless LAN device may be removably coupled with the host device. In an alternative embodiment, the wireless LAN device is not part of the host device and is communicatively coupled with the host device. Host device 12 comprises application logic 17. Method 30 of FIG. 2 is an example of application logic 17.

In WLAN 10, host device 12 is operable to communicate wirelessly with the aid of wireless LAN device 16 with AP 14. AP 14 coordinates communication between multiple host devices 12 which are within a range of AP 14. The range of AP 14 depends among other things on the wireless LAN standard being used for communication. The wireless LAN standard may be any standard now known or later developed, for example IEEE 802.11 standard, HiperLAN/2 (High Performance Radio Local Area Network) standard, HiperLAN/1 standard, and/or the like.

FIG. 2 is a flowchart of an embodiment of a method 30 for operating a wireless LAN device according to the invention. At block 32, a wireless LAN device, such as wireless LAN device 16 (FIG. 1), is initialized for wake events. In an exemplary embodiment, the wireless LAN device is initialized or set-up to stay powered on even when a host device, for example host device 12 (FIG. 1), with which the wireless LAN device is associated enters a low power mode, for example a standby or hibernation mode. If desired, in an alternative embodiment, the wireless LAN device is initialized to stay powered on even when the host device is powered off. In such an alternative embodiment, the wireless LAN device is powered by an independent power source. Referring to FIG. 2, at block 34, a determination is made as to whether the host device is entering a low power mode. If the host device is not entering a low power mode, then the process of block 34 is repeated.

Otherwise, at block 36, a disassociate request is transmitted to an access point with which the wireless LAN device is associated, for example access point 14 of FIG. 1. In an exemplary embodiment, the disassociate request comprises a request to the access point to disassociate the wireless LAN device from the access point and also to monitor for wake events related to the host device with which the wireless LAN device is associated. In an exemplary embodiment, a wake event comprises any event that requests or requires the host device to be awake or operating in other than a low power mode, for example in an operating mode. Examples of such wake events include, a VoWLAN (Voice over Wireless LAN) message or call, wake on LAN packets from a management console, and/or the like. In an exemplary embodiment, the disassociate request is transmitted as part of a management or control frame. The management frame may be any management frame now known or later developed. In an exemplary embodiment, the management frame comprises a disassociate request frame of a wireless LAN protocol. Upon receiving a disassociate request from the wireless LAN device, the access point executes the process starting at block 62 of method 60 of FIG. 3.

Continuing with FIG. 2, at block 38, the host device is switched to a low power mode. In an alternative embodiment, the host device is powered off. At block 40, a transceiver, for example transceiver 18 of FIG. 1, of the wireless LAN device is switched off. In an exemplary embodiment, only the transceiver of the wireless LAN device is switched off. Other elements of the wireless LAN device, for example memory, microcontroller, and/or the like, are not powered off. In an alternative embodiment, some or all of the other elements of the wireless LAN device are powered off. In an exemplary embodiment, at block 40, the wireless LAN device disassociates from the access point.

The wireless LAN device then waits for a predetermined time period (block 42). The time period for which the wireless LAN device waits is configurable and may depend on the application. For example, some applications may allow the time period to be long while some others may require that the time period be short. During the predetermined time period the transceiver remains powered off and does not transmit or receive signals. Therefore, the wireless LAN device consumes less power during the time that the transceiver is powered off. The time period for which the wireless LAN device waits may be configured by the user of the wireless LAN device or by someone else. If desired, the time period for which the wireless LAN device waits may be configured manually or automatically. For example, in one embodiment, the wireless LAN device is configured to wait for a fixed period of time. In an alternative embodiment, the wireless LAN device is configured to wait for variable time periods depending on activity of the host device. For example, the wireless LAN device waits for a longer time period when it detects that the host not been active for a long period.

In an alternative embodiment, the wireless LAN device waits for the occurrence of an event. For example, a device associated with the wireless LAN device or the host device may wake the wireless LAN device up or the host device may be switched to an operating mode indicating that the wireless LAN device should wake up.

At block 44, the transceiver of the wireless LAN device is switched on. At block 46, a determination is made as to whether the wireless LAN device is within range of the original access point to which it had sent the disassociate request. If the wireless LAN device is within range of the original access point to which it had sent the disassociate request, then the process starting at block 50 is executed. Otherwise, at block 48, the wireless LAN device locates a new access point within whose range it is located. The process starting at block 50 is then executed.

At block 50, a wake event status request is transmitted to the access point within whose range the wireless LAN device is located. The wake event status request may be transmitted to the access point regardless of whether the wireless LAN device is associated with the host device. The wake event status request is a request inquiring whether any wake events for the host device with which the wireless LAN device is associated occurred while the transceiver was powered off. If desired, the wake event status request may include an identifier, for example an IP (Internet Protocol) address, of the original access point which is monitoring for wake events for the host device. This is especially useful if the wireless LAN device is no longer within range of the original access point. In an alternative embodiment, the identifier is a basic service set identifier (BSSID) of the access point. In an exemplary embodiment, the BSSID is a combination of a service set identifier (SSID) and the Ethernet port MAC (Media Access Control) address of the access point.

In an exemplary embodiment, the wake event status request is transmitted as part of a management frame. The management frame may be any management frame now known or later developed. In an exemplary embodiment, for example, when the wireless LAN device is within range of the original access point, the management frame comprises a reassociate request frame of a wireless LAN protocol. In an alternative exemplary embodiment, for example, when the wireless LAN device is not within range of the original access point, the management frame comprises a probe request frame of a wireless LAN protocol. In this alternative embodiment, the probe request frame also includes an identifier, for example an IP address, of the original access point to which the wireless LAN device had transmitted a disassociate request. In an alternative embodiment, the identifier is the BSSID of the access point. Upon receiving a wake event status request from the wireless LAN device, the access point executes the process starting at block 82 of method 80 of FIG. 4.

Continuing with FIG. 2, at block 52 a wake event status response is received from the access point. The wake event status response is a status response indicating whether any wake event occurred during the time when the transceiver of the wireless LAN device was switched off. In an exemplary embodiment, the wake event status response is transmitted as part of a management frame. The management frame may be any management frame now known or later developed. In an exemplary embodiment, for example, when the wireless LAN device is within range of the original access point, the management frame comprises a reassociate response frame of a wireless LAN protocol. In an alternative exemplary embodiment, for example, when the wireless LAN device has determined a new access point, the management frame comprises a probe response frame of a wireless LAN protocol.

At block 54, the wake event status response is examined to determine whether a wake event occurred while the transceiver of the wireless LAN device was switched off. If it is determined that no wake event occurred during that time, then the process starting at block 40 is executed. If at block 54, it is determined that at least one wake event occurred while the transceiver was switched off, then the process starting at block 56 is executed. At block 56, the host device with which the wireless LAN device is associated is switched to a mode other than a low powered mode, for example an operating mode.

Figure 3:
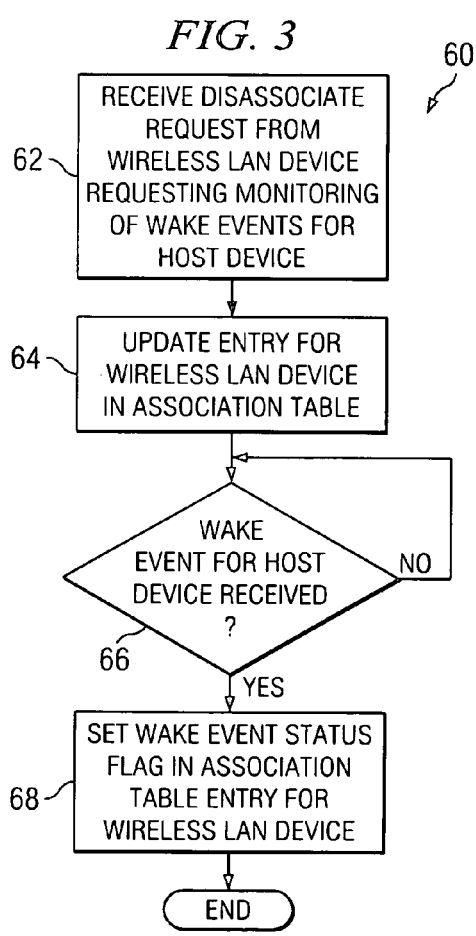
FIG. 3 is a flowchart of an embodiment of a method for monitoring for a wake event in a wireless local area network according to the invention.
Figure 4:
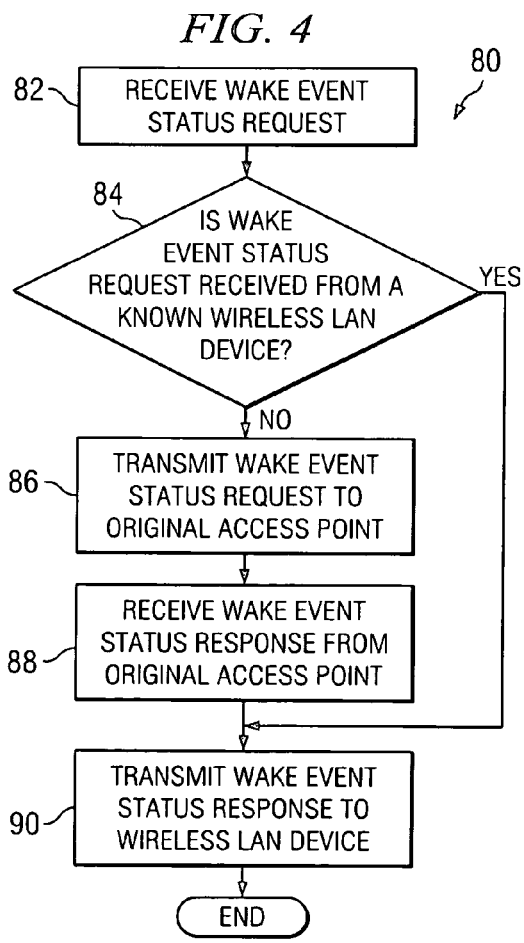
FIG. 4 is a flowchart of an embodiment of a method for responding to a wake event status request according to the invention.

FIG. 3 is a flowchart of an embodiment of a method 60 for monitoring for a wake event in a wireless local area network according to the invention. At block 62, a disassociate request is received from the wireless LAN device or the host device requesting the access point to monitor for wake events related to the host device.

At block 64, the access point updates the entry in an association table, for example association table 15 of FIG. 1, corresponding to the wireless LAN device from which the disassociate request is received. The status of the wireless LAN device is marked in the association table as being in a wake event monitoring state. If desired, a wake event status flag for the wireless LAN device in the association table is reset. In an exemplary embodiment, the access point also marks the entry for the wireless LAN device as no longer being associated with the access point so that the access point will not attempt to communicate with the wireless LAN device.

At block 66, the access points monitors for occurrence of wake events for the host device. In an exemplary embodiment, the access point monitors received data packets to determine whether the data packets are destined for the host device. In an alternative embodiment, the access point monitors to determine whether a request to wake up the host device has been received. Upon the occurrence of a wake event the process staring at block 68 is executed. At block 68, the wake event status flag in the association table entry for the wireless LAN device is set to indicate that a wake event for the host device has occurred. Once a wake event occurs for the host device, the access point stops monitoring for wake events for that host device. In an exemplary embodiment, because the wireless LAN device is no longer associated with the access point, the access point does not attempt to communicate with the wireless LAN device or the host device, until a wake event status request is received.

FIG. 4 is a flowchart of an embodiment of a method 80 for responding to a wake event status request according to the invention. At block 82, a wake event status request is received. In an exemplary embodiment, the wake event status request is received by an access point, for example access point 14 (FIG. 1), from a host device, for example host device 12, or a wireless LAN device, for example wireless LAN device 16. The access point may receive the wake event status request from a known or an unknown wireless LAN device.

Referring to FIG. 4, at block 84, a determination is made as to whether the wake event status request is received from a known wireless LAN device. In an exemplary embodiment, this determination is made by looking in the association table of the access point to determine whether there is an entry for the wireless LAN device in the association table. If the wake event status request is received from a known wireless LAN device, then the process starting at block 90 is executed. Otherwise, the process starting at block 86 is executed. At block 86, the access point transmits the wake event status request to the original access point to which the wireless LAN device had sent the request to monitor for wake events. In an exemplary embodiment, the access point transmits the wake event status request to the original access point via communication network 16 (FIG. 1). Referring to FIG. 4, at block 88, a wake event status response is received from the original access point.

At block 90, the wake event status response indicating whether a wake event occurred while the transceiver was switched off is transmitted to the wireless LAN device. In an exemplary embodiment, the wake event status response is transmitted to the wireless LAN device by the access point receiving the wake event status request from the wireless LAN device. If desired, the wake event status response may be transmitted by the original access point to the wireless LAN device directly.

Embodiments of the present invention may be implemented in software, hardware, application logic or a combination of software, hardware and application logic. The software, application logic and/or hardware may reside on host device 12, access point 14 or wireless LAN device 16. If desired, part of the software, application logic and/or hardware may reside on host device 12, part of the software, application logic and/or hardware may reside on access point 14, and part of the software, application logic and/or hardware may reside on wireless LAN device 16. The application logic, software or an instruction set is preferably maintained on any one of various conventional computer-readable media. In the context of this document, a "computer-readable medium" can be any means that can contain, store, communicate, propagate or transport the instructions for use by or in connection with an instruction execution system, apparatus, or device.

If desired, the different functions discussed herein may be performed in any order and/or concurrently with each other. Furthermore, if desired, one or more of the above-described functions may be optional or may be combined.

A technical advantage of an exemplary embodiment of the present invention is that power consumption by the wireless LAN device, and hence the host device, is reduced. Another technical advantage of an exemplary embodiment of the present invention is that the host device can roam from one access point to another and still have wake events for the host device monitored. Another technical advantage of an exemplary embodiment of the present invention is that the transceiver of the wireless LAN device may be switched off for a long period of time.

What is claimed is:

1. A method, comprising:
   transmitting, from a wireless local area network (LAN) device of a host device to an access point of a wireless network, a request to disassociate from said access point, said request to disassociate further comprising a request to monitor for wake events for said host device;
   switching off a transceiver of said wireless LAN device after transmission of said disassociate request;
   switching on said transceiver of said wireless LAN device; and
   transmitting, to a second access point, a request inquiring whether at least one wake event for said host device occurred while said transceiver was switched off.

2. The method of claim 1, wherein said wireless network comprises a wireless LAN.

3. The method of claim 1, further comprising switching on said transceiver of said wireless LAN device in response to occurrence of an event.

4. The method of claim 1, further comprising switching on said transceiver of said wireless LAN device after a predetermined time period.

5. The method of claim 1, further comprising transmitting a request inquiring whether at least one wake event for said host device occurred while said transceiver was switched off.

6. The method of claim 5, wherein said transmitting said request comprises transmitting said request to said access point monitoring for wake events for said host device.

7. The method of claim 1, further comprising switching said host device to an operating mode in response to receiving an indication that at least one wake event for said host device occurred while said transceiver was switched off.

8. The method of claim 1, further comprising switching off said transceiver of said wireless LAN device in response to receiving an indication that no wake event for said host device occurred while said transceiver was switched off.

9. The method of claim 1, further comprising determining a second access point of said wireless network in response to said wireless LAN device not being within range of said first access point.

10. The method of claim 1, further comprising switching off said transceiver of said wireless LAN device in response to receiving a response from said second access point.

11. The method of claim 1, further comprising switching said host device to an operating mode in response to receiving a response from said second access point.

12. A method, comprising:
receiving, from a wireless local area network (LAN) device of a host device, a request to disassociate from an access point, said request to disassociate further comprising a request to monitor for at least one wake event for said host device;
transmitting, in response to receiving a request for a wake event status, a wake event status indicating whether at least one wake event for said host device occurred; and
updating a status of said wireless LAN device in an association table of said access point in response to determining that at least one wake event for said host device has occurred, wherein updating the status of said wireless device includes marking the status of said wireless LAN device as being in a wake event monitoring state, resetting a status flag for the wireless LAN device, and marking an entry for the wireless LAN device as no longer being associated with the access point so that the access point will not attempt to communicate with the wireless LAN device.

13. The method of claim 12, further comprising monitoring for at least one wake event for said host device.

14. The method of claim 12, further comprising receiving said request for said wake event status from said wireless LAN device.

15. The method of claim 14, further comprising determining whether said wireless LAN device from which said request for said wake event status is received is a known wireless LAN device.

16. The method of claim 12, further comprising: receiving said request for said wake event status from another access point; and transmitting said wake event status to said another access point.

17. A system, comprising:
application logic operable to:
transmit, from a wireless local area network (LAN) device of a host device to an access point of a wireless network, a request to disassociate from said access point, said request to disassociate further comprising a request to monitor for wake events for said host device;
switch off a transceiver of said wireless LAN device after transmission of said disassociate request;
switch on said transceiver of said wireless LAN device; and
transmit, to a second access point, a request inquiring whether at least one wake event for said host device occurred while said transceiver was switched off.

18. The system of claim 17, wherein said wireless network comprises a wireless LAN.

19. The system of claim 17, said application logic further operable to switch on said transceiver of said wireless LAN device in response to occurrence of an event.

20. The system of claim 17, said application logic further operable to switch on said transceiver of said wireless LAN device after a predetermined time period.

21. The system of claim 17, said application logic further operable to transmit a request inquiring whether at least one wake event for said host device occurred while said transceiver was switched off.

22. The system of claim 21, said application logic further operable to transmit said request to said access point monitoring for wake events for said host device.

23. The system of claim 17, said application logic further operable to switch said host device to an operating mode in response to an indication that at least one wake event for said host device occurred while said transceiver was switched off.

24. The system of claim 17, said application logic further operable to switch off said transceiver of said wireless LAN device in response to an indication that no wake event for said host device occurred while said transceiver was switched off.

25. The system of claim 17, said application logic further operable to determine a second access point of said wireless network in response to said wireless LAN device not being within range of said first access point.

26. The system of claim 17, said application logic further operable to switch off said transceiver of said wireless LAN device in response to receipt of a response from said second access point.

27. The system of claim 17 said application logic further operable to switch said host device to an operating mode in response to receipt of a response from said second access point.

28. A system, comprising:
application logic operable to:
receive, from a wireless local area network (LAN) device of a host device, a request to disassociate from an access point, said request to disassociate further comprising a request to monitor for at least one wake event for said host device;
transmit, in response to receipt of a request for a wake event status, a wake event status indicating whether at least one wake event for said host device occurred; and
update a status of said wireless LAN device in an association table of said access point in response to determining that at least one wake event for said host device has occurred, wherein updating the status of said wireless device includes marking the status of said wireless LAN device as being in a wake event monitoring state, resetting a status flag for the wireless LAN device, and marking an entry for the wireless LAN device as no longer being associated with the access point so that the access point will not attempt to communicate with the wireless LAN device.

29. The system of claim 28, said application logic further operable to monitor for at least one wake event for said host device.

30. The system of claim 28, said application logic further operable to receive said request for said wake event status from said wireless LAN device.

31. The system of claim 30, said application logic further operable to determine whether said wireless LAN device from which said request for said wake event status is received is a known wireless LAN device.

32. The system of claim 28, said application logic further operable to: receive said request for said wake event status from another access point; and transmit said wake event status to said another access point.

33. The system of claim 28, said application logic further operable to update a status of said wireless LAN device in an association table of said access point in response to a determination that at least one wake event for said host device has occurred.

* * * * *